Sept. 3, 1929.　　　G. A. TILLMAN　　　1,727,141
RESILIENT TIRE
Filed May 1, 1928　　　2 Sheets-Sheet 1
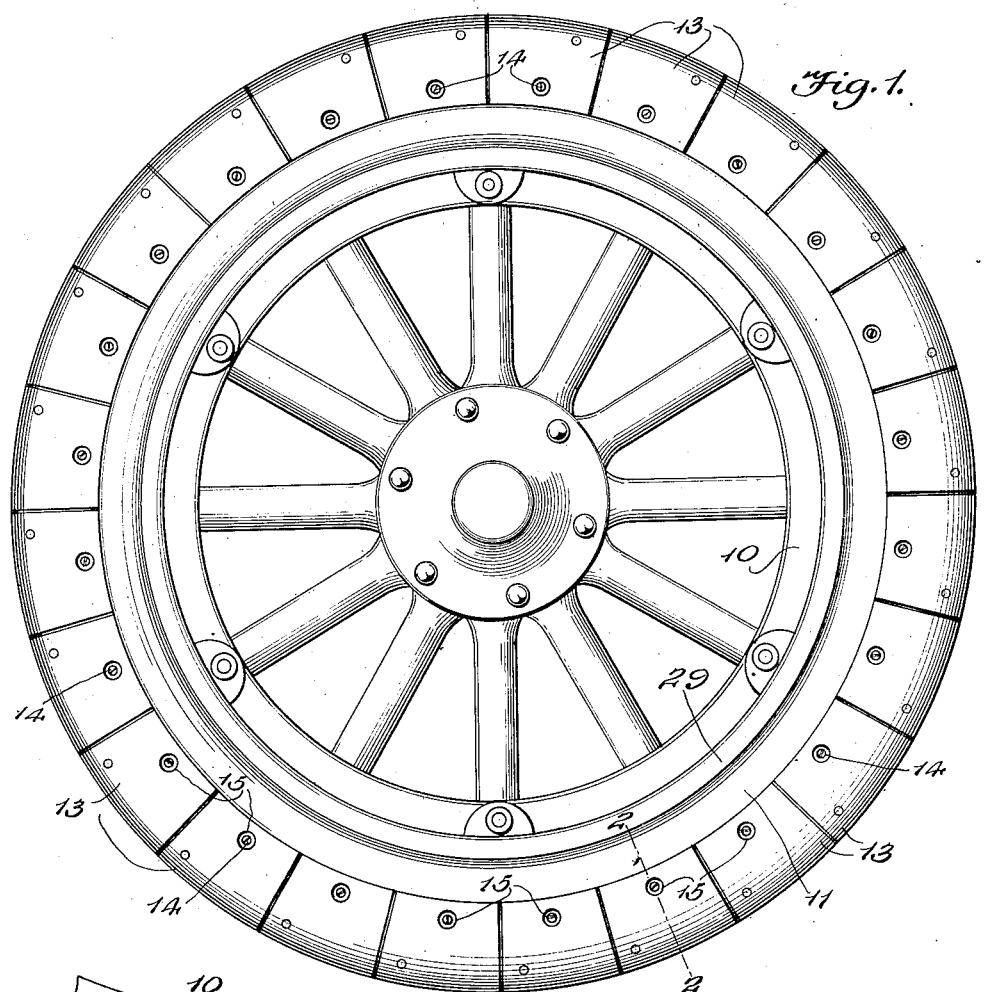
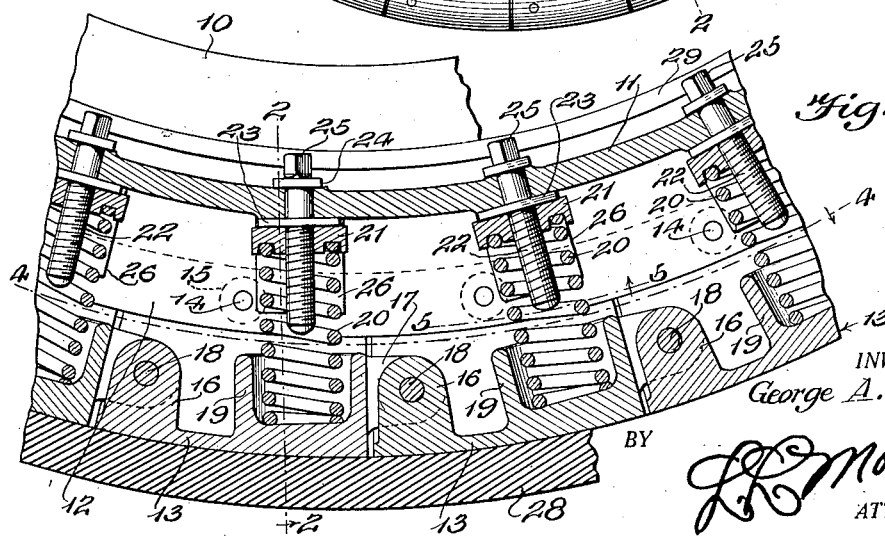
INVENTOR.
George A. Tillman.
BY
ATTORNEY.

Sept. 3, 1929.  G. A. TILLMAN  1,727,141
RESILIENT TIRE
Filed May 1, 1928   2 Sheets-Sheet 2

INVENTOR.
George A. Tillman.
BY
ATTORNEY.

Patented Sept. 3, 1929.

1,727,141

UNITED STATES PATENT OFFICE.

GEORGE A. TILLMAN, OF VANCOUVER, WASHINGTON.

RESILIENT TIRE.

Application filed May 1, 1928. Serial No. 274,217.

This invention relates to resilient tires and has for an object to provide a tire having new and improved type of jointed armor structure and resilient or yielding supporting members. A further object of the invention is to provide a resilient tire composed of an inner inarticulated annulus and an outer armor of articulated segments, each of said segments being independently supported by an interior resilient member of approved type. A further object of the invention is to provide a resilient tire composed of articulated segments with improved means for varying the resilient tension upon each of the segments independently. A further object of the invention is to provide a resilient tire composed of inner, rigid or inarticulated annulus with a plurality of externally positioned articulated segments connected with the annulus, all so combined as to permit the employment of an outer casing of rubber or the like to resemble in all appearances a pneumatic tire of known type.

With these and other objects in view, the invention comprises certain novel parts, elements, units, constructions, combinations, interactions, mechanical movements and functions as disclosed in the drawings together with mechanical and functional equivalents thereof as will be hereinafter more fully described and claimed.

In the drawings:

Figure 1 is a view of a wheel in side elevation with the tire thereon complete omitting, however, the outer casing of rubber or the like.

Figure 3 is a fragmentary sectional view taken circumferentially of the wheel and upon a plane parallel with the plane of the wheel showing also line 2—2 as indicating the plane of Figure 2.

Like characters of reference indicate corresponding parts throughout the several views.

Figure 2:
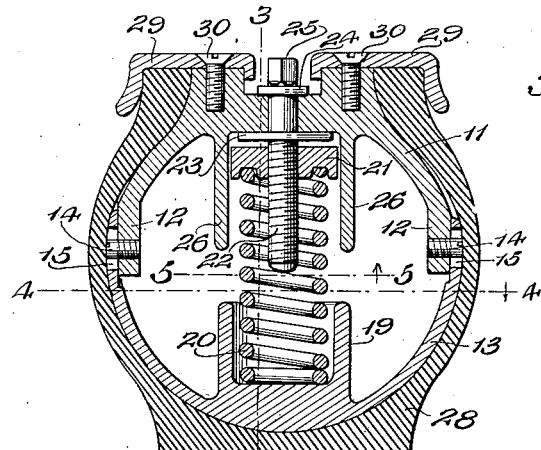
Figure 2 is a transverse sectional view taken with the outer casing applied.
Figure 4:
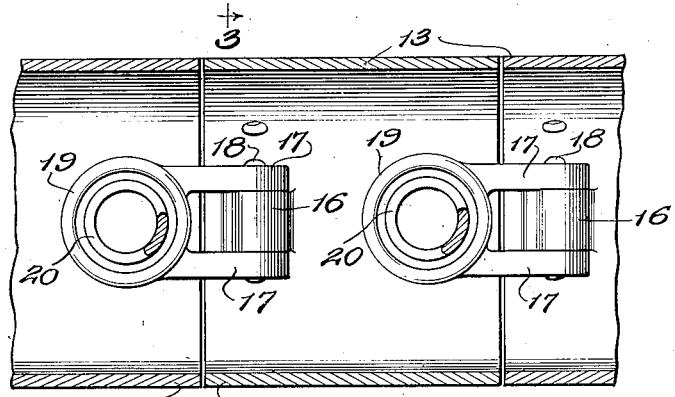
Figure 4 is a fragmentary sectional view taken on line 4—4 of Figures 2 and 3.

The improved resilient tire which forms the subject matter of this application is adapted to be associated with vehicle wheels of the usual and ordinary type, one of which is represented at 10 as merely a conventional type and in no way limiting the present invention. About the wheel, either upon the usual and ordinary rim or otherwise attached as occasion may make desirable, an annulus 11 is secured, preferably a rigid integral structure built to conform to the size and other dimensions of the wheel to which it is to be applied. The annulus 11 is in the general form of a channel, being somewhat U-shape in cross section, having spaced ribs or flanges 12. Upon this annulus, are mounted a plurality of segments 13, each pivotally connected with the annulus by a screw or like member 14 which said fastening member extends through a perforation 15 larger than the diameter of the screw 14 so that the segment is permitted movement relative to the annulus not only upon the pivot 14 as such but about said pivot as occasion may make necessary. Each of the segments is provided adjacent one end with an upstanding ear 16 and at its opposite end with ears 17 properly spaced to receive the ear 16 therebetween, and the segments are pivotally connected together by means of a pintle 18 through these associated ears. The segments are, therefore, not only pivotally and loosely connected with the annulus but are also articulated each to the other, permitting independent movement of each segment relative to its neighbor.

Figures 5, 6:
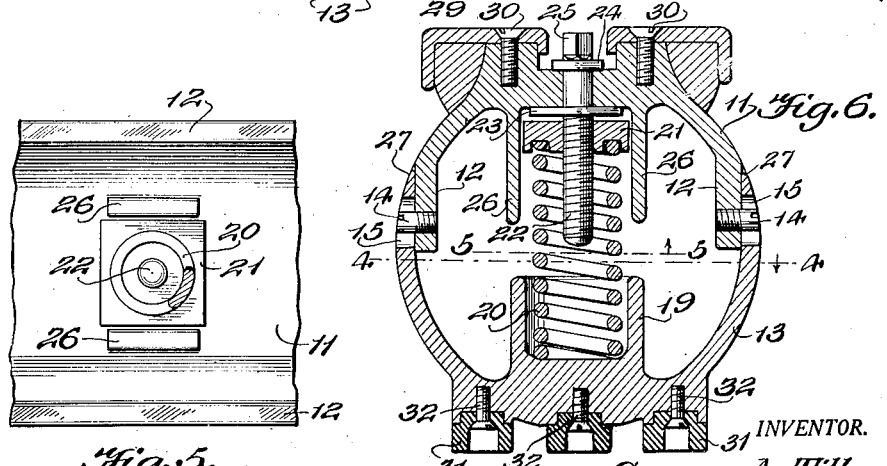
Figure 5 is a fragmentary sectional view taken on line 5—5 of Figures 2 and 3.
Figure 6 is a transverse sectional view taken on the same plane as Figure 2 but showing a modified type of external finish.

To resiliently maintain the segments at a working position, cups 19 are formed within the segments, and springs 20 are placed with their outer ends within this cup. For engaging the ends of the springs opposite the cup, nuts 21 are employed with screws 22 extending through the annulus 11 and engaging the nut, which said nut is provided with an annular furrow to receive the end of the spring. To prevent displacement of the screw relative to the annulus, a collar 23 is rigidly attached to the screw within the annulus, and a collar 24 to the screw without the annulus so that, while the screw may turn, it is held against longitudinal movement by the collars 23 and 24 spaced upon opposite sides of the annulus structure. To provide means for turning the screw, a squared or other multi-angular shank 25 is provided to which a wrench or key may be applied for turning the screw. By turning the screw and maintaining the nut 21 against rotation, it will be obvious that the spring 20 may be placed under greater or less tension as occasion may make necessary or desirable. To prevent the turning of the nut, lugs 26 are cast or otherwise produced upon the interior of the annulus, properly spaced to permit the sliding of the nut 20 therebetween, as indicated at Figures 2 and 5 but to prevent the rotation of the nut so that, by turning the screw 22, the desired tension may be applied to the spring 20. The inner edges of the segments are preferably tapered, as indicated at 27, so that the structure composed of the annulus 11 and the several segments 13 present a relatively smooth and approximately circular tructure upon which an outer casing 28 of the usual and ordinary type may be applied, held in position by rim members 29. These members 29 are rigidly secured to the annulus 11 in any approved manner as by the screws 30 so that they become for all practical purposes the equivalent of a rim ordinarily used for maintaining pneumatic or other tires in position and are separated into halves as indicated more particularly at Figures 2 and 6 to permit access to the squared ends 25 of the screws for adjustment. Instead, however, of employing the casing 28, a type is shown at Figure 6 to which a plurality of resilient cups or other tread members 31 are applied by the use of screws 32 or any approved fastening members. In this type, such of the tread members 31 as become worn may be independently and individually replaced. In all other respects, the type shown at Figure 6 is the equivalent of the type shown at Figure 2.

What I claim to be new is:

A resilient tire comprising an annulus substantially U-shape in cross section, a plurality of segments substantially U-shape in cross section and adapted to co-act with the annulus, means pivoting the several segments to the annulus to provide for limited movement upon all radii of the pivot, hinge members carried by the segments, each adapted to co-act with a hinge member carried by the neighboring segment, a series of springs each having one end seated against one of the segments, a nut interposed between the opposite end of each spring and the interior of the annulus, screws inserted through the annulus and engaging the nuts, means without the annulus for rotating the screws for moving the nuts, and abutments built within the annulus maintaining the nuts against rotation.

In testimony whereof I affix my signature.

GEORGE A. TILLMAN.